(12) United States Patent
Saunders et al.

(10) Patent No.: US 7,987,775 B2
(45) Date of Patent: Aug. 2, 2011

(54) CONTINUOUS FOOD COOKER

(75) Inventors: Craig M. Saunders, Rocky River, OH (US); Jeffrey Kalman, Cleveland Heights, OH (US); Marc L. Vitantonio, South Russell, OH (US); Jayson C. Simeon, Lakewood, OH (US)

(73) Assignee: Nottingham-Spirk Design Associates, Inc., Cleveland, OH (US)

( * ) Notice: Subject to any disclaimer, the term of this patent is extended or adjusted under 35 U.S.C. 154(b) by 1504 days.

(21) Appl. No.: 11/408,235

(22) Filed: Apr. 20, 2006

(65) Prior Publication Data
US 2006/0236873 A1 Oct. 26, 2006

Related U.S. Application Data

(60) Provisional application No. 60/673,114, filed on Apr. 20, 2005, provisional application No. 60/689,215, filed on Jun. 10, 2005.

(51) Int. Cl.
*A21B 5/02* (2006.01)
*A21B 1/48* (2006.01)
*A47J 37/06* (2006.01)
*A47J 37/08* (2006.01)
*A47J 37/04* (2006.01)
*A23L 3/18* (2006.01)

(52) U.S. Cl. .............. 99/373; 99/349; 99/386; 99/443 C

(58) Field of Classification Search .................. 99/372, 99/373, 374, 377, 379, 389, 390, 391, 427; 100/327, 328, 329, 330, 331, 332, 333, 334, 100/335, 336
See application file for complete search history.

(56) References Cited

U.S. PATENT DOCUMENTS

| 2,172,699 | A | * | 9/1939 | Cohn | 426/457 |
|---|---|---|---|---|---|
| 2,756,696 | A | * | 7/1956 | Wise | 99/383 |
| 3,273,300 | A | * | 9/1966 | Watrous et al. | 53/435 |
| 3,543,694 | A | * | 12/1970 | Carre et al. | 99/335 |
| 3,780,193 | A | | 12/1973 | Jersey | |
| 3,782,428 | A | * | 1/1974 | Cartwright et al. | 141/115 |
| 4,025,267 | A | | 5/1977 | Amato et al. | |
| 4,046,924 | A | * | 9/1977 | Tanguy | 426/502 |
| 4,058,039 | A | | 11/1977 | Schmid | |
| 4,283,430 | A | * | 8/1981 | Doster et al. | 426/284 |

(Continued)

FOREIGN PATENT DOCUMENTS

GB 2135178 8/1984

(Continued)

*Primary Examiner* — Reginald L. Alexander
*Assistant Examiner* — Hemant Mathew
(74) *Attorney, Agent, or Firm* — Fay Sharpe LLP

(57) ABSTRACT

The present invention relates to a portable household food cooker capable of receiving a food mixture and producing food items in a continuous fashion. The continuous food cooker generally includes a housing and a hopper. The hopper is disposed above the housing for receiving the food mixture and for dispensing the food mixture into the cooker. The continuous food cooker also includes a hot roller assembly for forming and cooking the food mixture, a hot roller drive assembly operatively attached to at least one roller, and a cutter for cutting the produced food item at a desired length. The hot roller assembly includes at least one rotatable roller and at least one heating element for heating the at least one roller. The at least one roller and the at least one heating element are disposed internally to the housing.

33 Claims, 7 Drawing Sheets

U.S. PATENT DOCUMENTS

| | | | |
|---|---|---|---|
| 4,401,015 A | | 8/1983 | Ziegler |
| 4,425,720 A | * | 1/1984 | Elevitch ........................ 34/233 |
| 4,634,061 A | * | 1/1987 | Williams ................ 241/101.01 |
| 4,655,125 A | | 4/1987 | Ishida et al. |
| 4,667,588 A | * | 5/1987 | Hayashi ........................ 99/372 |
| 5,077,072 A | * | 12/1991 | Sieradzki ...................... 426/523 |
| 5,142,967 A | | 9/1992 | Herting |
| 5,458,051 A | * | 10/1995 | Alden et al. ................... 99/349 |
| 5,499,695 A | * | 3/1996 | Doom, Jr. ..................... 187/244 |
| 5,673,608 A | * | 10/1997 | DeMars ....................... 99/329 R |
| 6,192,789 B1 | * | 2/2001 | Agcaoili et al. ............... 99/349 |
| 6,223,650 B1 | * | 5/2001 | Stuck .............................. 99/386 |
| 6,311,610 B1 | * | 11/2001 | Kettman ......................... 99/386 |
| 6,796,301 B2 | | 9/2004 | Haas et al. |
| 6,820,539 B2 | | 11/2004 | Haas et al. |
| 7,325,483 B2 | * | 2/2008 | Szymanski .................... 99/349 |
| 2005/0072311 A1 | * | 4/2005 | Szymanski .................... 99/349 |
| 2005/0229919 A1 | * | 10/2005 | Sands et al. ................. 126/41 C |

FOREIGN PATENT DOCUMENTS

| | | |
|---|---|---|
| JP | 55085375 | 6/1980 |
| WO | WO 01/17359 | 3/2001 |

* cited by examiner

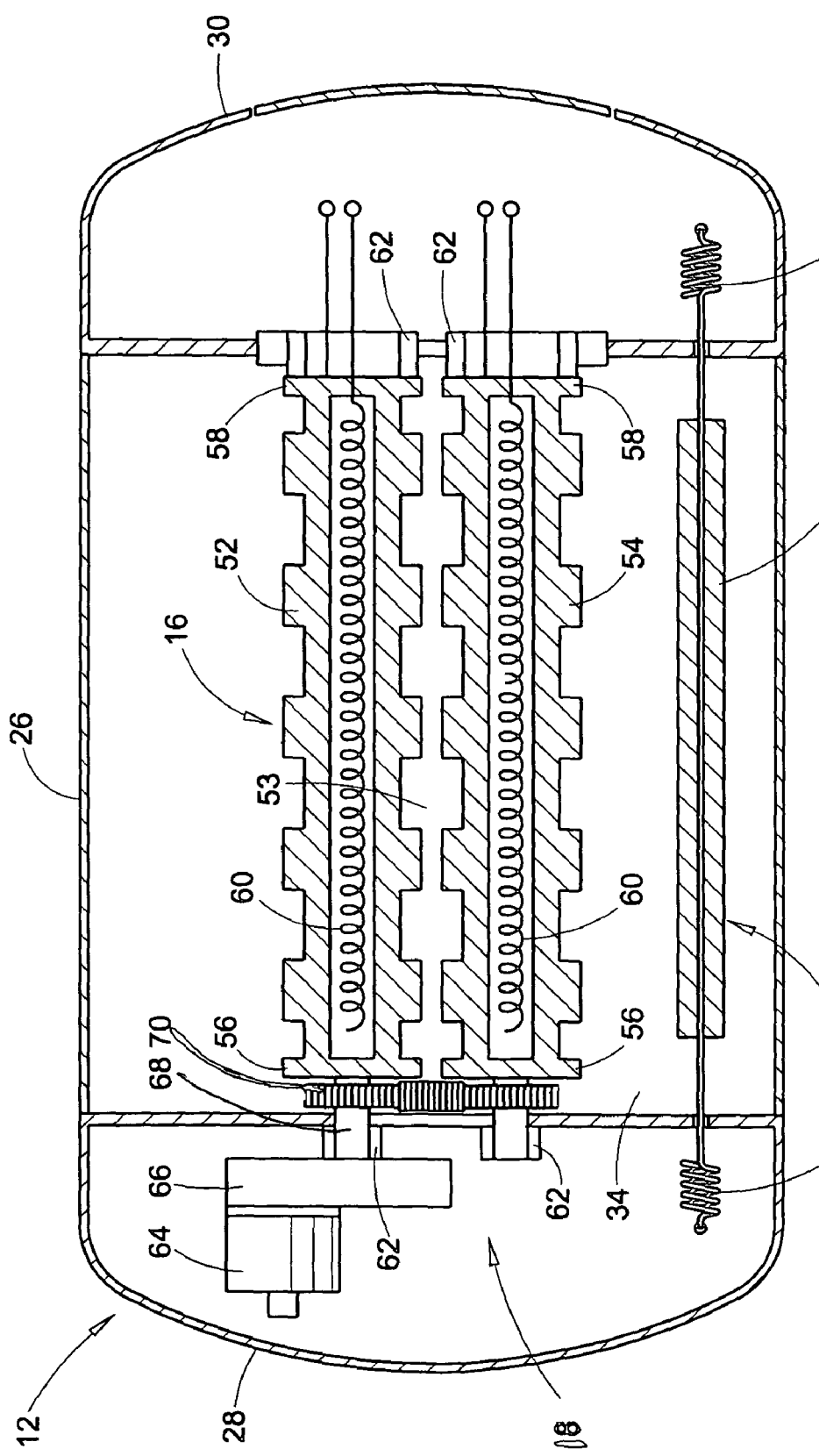

CONTINUOUS FOOD COOKER

A claim for domestic priority is made herein under 35 U.S.C. §119(e) to U.S. Provisional App. Ser. No. 60/673,114 filed on Apr. 20, 2005 and U.S. Provisional App. Ser. No. 60/689,215 filed on Jun. 10, 2005, the entire disclosures of which is incorporated herein by reference.

BACKGROUND

The present invention relates to devices for producing food products in a continuous fashion. Particularly, the present invention is directed to the art of food production for the home and other small scale production settings.

Generally, large scale food production equipment that mold, cook, and fill food products are known in the art. Because this type of equipment is purposefully designed for large scale continuous production, the equipment is usually bulky, heavy, and expensive. However, the need for continuous food production equipment not only exists for large scale production facilities but for the common household as well.

Existing food cookers for the common household require a significant amount of user intervention. The user must individually apply a food mixture to a hot plate and meticulously observe the mixture such that it cooks thoroughly without burning. This process is inconvenient for the user because it is time consuming and must be repeated for each individual serving of food. In addition, it is often the case when such single serve equipment can produce inconsistent results based on the inattention of the user. For one reason or another, the user may become distracted or simply forget how long the mixture has been cooking. This results in either under or overcooked food.

Therefore, for the reasons discussed above, it is the objective of the present invention to provide certain improvements in the art of continuous food cooking devices.

SUMMARY OF THE INVENTION

The present invention sets forth multiple novel improvements to the art of household food cooking devices. These improvements involve the consistency, volume, speed, and convenience with which food may be made in the home. The invention described herein is a device that is portable, simple to use, and is capable of producing food items in a continuous fashion.

The continuous food cooker generally includes a housing, a mixture hopper for receiving a food mixture, a hot roller assembly for forming and cooking the mixture, a hot roller drive assembly for driving the hot roller assembly, and a cutter assembly for cutting the produced food item.

In a first embodiment, the mixture hopper is disposed above the housing. The mixture hopper includes a reservoir and a synchronized mixture dispensing cam that is rotatably mounted at a lower region of the reservoir. The mixture dispensing cam meters the flow of uncooked food mixture into the hot roller assembly and dispenses the mixture in sync with the hot roller drive assembly. The mixture is cooked as it enters a cooking zone and passes through a channel between the hot rollers. The produced food item exits along a dispensing tray attached to the housing of the continuous food cooker. When the continuous food cooker is not in use, the dispensing tray may be folded in an upright closed position. As the cooked mixture glides along the dispensing tray, it passes under a cutter assembly. When the food item has reached the desired length, the user may depress a cutter to slice off a portion of the food item.

In a second embodiment the hot rollers are detachable from the hot roller assembly for cleaning and maintenance.

In a third embodiment the hot rollers, the roller journals, and one carrying handle are integrated so as to provide a convenient and aesthetic means of removing and replacing the detachable hot rollers.

In a fourth embodiment the hot rollers include a plurality of rectangular surface features that protrude along a cylindrical outer skin of the rollers (e.g. for producing waffles).

In a fifth embodiment the hot rollers are substantially smooth along a cylindrical outer skin of the rollers (e.g. for producing pancakes, bread, or cooking bacon).

In a sixth embodiment the hot rollers include a plurality of depressed surface features that are recessed along a cylindrical outer skin of the rollers (e.g. for producing cookies).

In a seventh embodiment the hot rollers include a plurality of strip-like longitudinally oriented surface features (e.g. for grilling sandwiches or toasting bread).

BRIEF DESCRIPTION OF THE DRAWINGS

The invention may take form in certain structures and components, several embodiments of which will be discussed in detail in this specification and illustrated in the accompanying drawings. In the drawings:

FIG. 1A is a horizontal sectional view of the first embodiment of the continuous food cooker through the hot roller assembly and the hot roller drive assembly.

DETAILED DESCRIPTION

Figure 1:
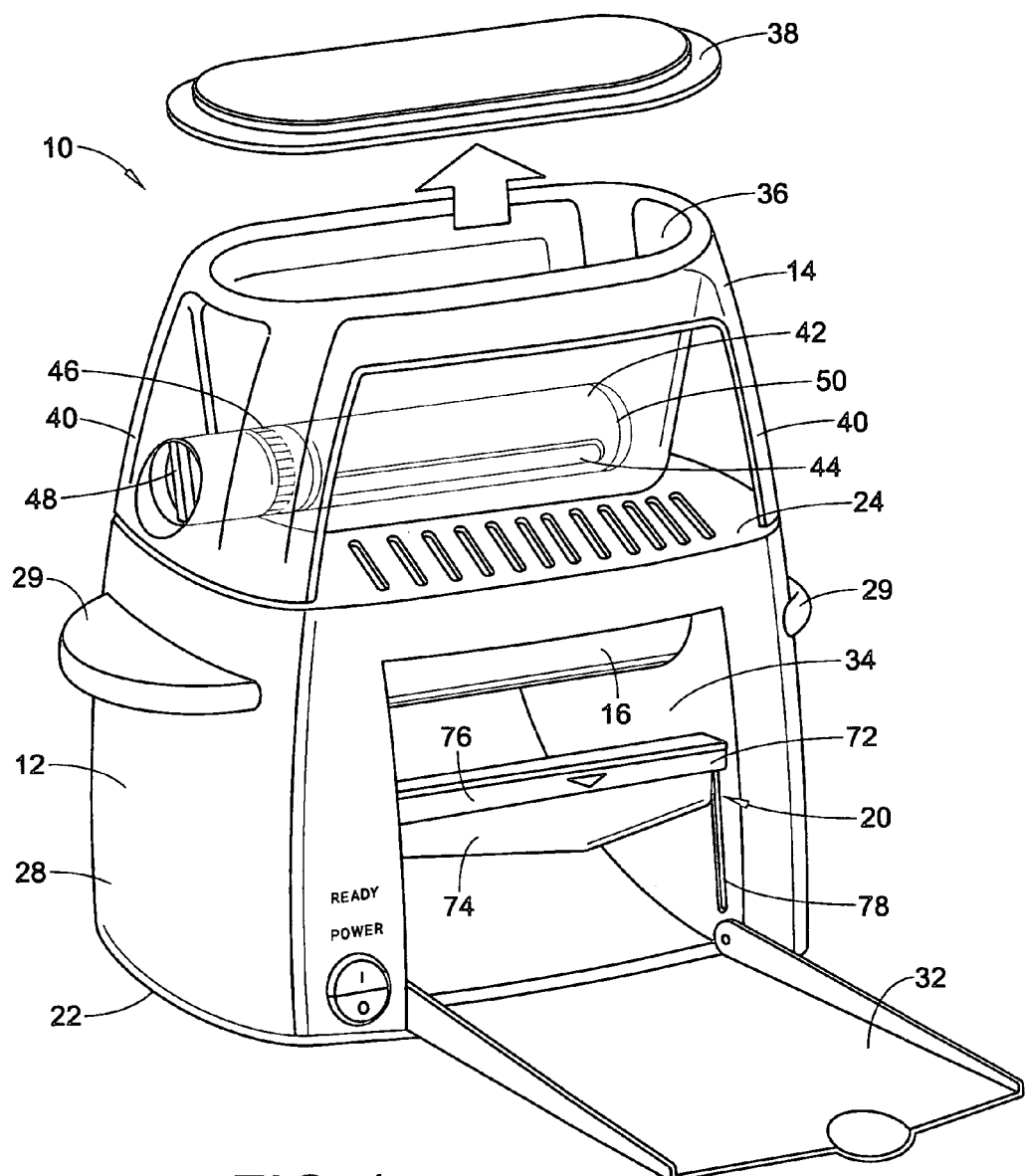
FIG. 1 is a perspective view of a first embodiment of the continuous food cooker invention.

With reference to FIG. 1, a first embodiment of a continuous food cooker 10 is shown which generally comprises a frame or housing 12, a food mixture hopper 14, a hot roller assembly 16, a hot roller drive assembly 18 and a cutter assembly 20. The housing generally includes a base 22, a top panel 24, a rear panel 26, a left and right side panel 28, 30, and a forward facing fold down dispensing tray 32. The dispensing tray has two positions, an upright closed position and an open position. When the dispensing tray 32 is in the upright closed position, a hot roller cavity area 34 is defined directly behind the dispensing tray 32. Generally, the hot roller assembly 16 is located in the upper portion of the hot roller cavity area 34. In addition, the cutter assembly 20 is located in the forward facing region of the hot roller cavity 34. The housing may be formed of a light weight plastic material, yet resilient enough to withstand high temperature. The base, the top panel, the rear panel and the side panels may all be formed together in a one-piece type construction. In addition, a pair of handles 29 may be fastened to side panels 28, 30. The handles 29 provide a convenient gripping area for transporting the continuous food cooker.

The mixture hopper 14 generally includes a reservoir 36, a removable lid 38, a pair of downward projecting support members 40, and a mixture dispensing cam 42. A food mixture 2 may be placed in the reservoir 36. The mixture dispensing cam 42 is located at a lower region of the reservoir 36 and serves as a valve for metering the flow of the food mixture 2. The mixture dispensing cam 42 has a longitudinal dispensing slot 44, a timing gear 46, a driven end 48, and a free end 50. In the first embodiment, the timing gear 46 is operatively attached or connected to the hot roller assembly 16 such that when the hot roller assembly 16 is in motion, it is synchronized with the mixture dispensing cam 42 via the timing gear 46. Also, the mixture hopper 14 may be formed of translucent plastic material such that it is easy for the user to determine what the level is of the food mixture 2. The pair of downward projecting support members 40 engage the top panel 24 of the housing 12 of the continuous food cooker 10. The downward projecting support members 40 engage the top panel 24 of the housing 12 such that the food mixture 2 is dispensed through the dispensing slot 44 in alignment with the hot roller assembly 16.

Now with reference to FIG. 1A, the hot roller assembly 16 is shown. In the first embodiment, the hot roller assembly 16 generally includes a first and a second hollow hot roller 52, 54. Each roller has a driven end 56 and a free end 58. The hot roller assembly 16 also includes heating elements 60 along with a plurality of roller journals 62. The first and second hot rollers 52, 54 are aligned in a parallel configuration in close proximity to one another such that a mixture channel 53 is defined between them. The roller journals 62 act to capture the driven ends 56 and the free ends 58 of the first and second hot rollers 52, 54. The heating elements 60 may be fixed either to the internal hollow portion of the rollers 52, 54 or they may be fixed to an internal support wall of the hot roller cavity 34. However, fixing the heating elements 60 to the rollers 52, 54 will require the use of a slip ring in order to maintain an electrical connection with the heating elements 60. Preferably, the heating elements 60 are fixed with respect to the hot roller cavity 34 such that a slip ring is not necessary thereby reducing the associated cost. In addition, more uniform heating of the hot rollers 52, 54 occurs when the heating elements 60 are stationary and the hot rollers 52, 54 are permitted to rotate about the heating elements 60. The heating elements 60 are appropriately sized such that when electricity is passed through them, adequate heat is generated in order to heat the rollers 52, 54 and cook the mixture 2 as it passes through the channel 53. Driven ends 56 of the rollers 52, 54 are driven by the hot roller drive assembly 18.

The hot roller drive assembly 18 generally comprises a motor 64, a reduction unit 66 and a gear train 70. The motor 64 is coupled to a reduction unit 66 which acts to reduce the speed and increase the torque of the motor 64. The reduction unit 66 includes an output shaft 68. The output shaft 68 may be directly coupled to the first roller 52 or may be coupled to the first hot roller 52 through a series of gears. In the first embodiment, the output shaft 68 is directly connected to the first roller 52. The second hot roller 54 is driven off of the output shaft through a gear train 70. The first hot roller 52 and the second roller 54 rotate in opposite directions such that if the first hot roller 52 is rotating in a clockwise direction, the second hot roller 54 is rotating in a counter clockwise direction. It is also important that the hot rollers rotate at the same rate of speed. Otherwise, the food items will become distorted as they are cooked.

Now with reference to both FIGS. 1 and 1A, the cutter assembly 20 is shown. The cutter assembly 20 generally comprises a cutter portion 72, a cutter surface 74, a cutter handle 76, a pair of tracks 78 and a biasing element 80. In the first embodiment, the cutter portion 72 is slidably engaged in the tracks 78. The tracks 78 are vertically oriented in a forward region of the hot roller cavity 34. The tracks 78 are disposed on either side of the hot roller cavity and provide a method of mounting the cutter portion 72. The cutter portion 72 effectively has two positions, an upper and a lower position. The biasing elements 80 maintain the cutter portion 72 in the upper position. When the user desires to cut off a portion of the food item, the user pushes directly down on the handle portion 76 of the cutter portion 72 until slicing all the way through the food item.

Now with reference to FIGS. 1A, 2, and 2A, one cycle of operation of the continuous food cooker 10 will be discussed. After mixing the appropriate ingredients to form a food mixture 2, the food mixture is placed in the reservoir of the mixture hopper 14. By way of example only, and for the purposes of explaining one cycle of operation, the food mixture may be a pancake or waffle batter mixture. At this point, the food cooker 10 is plugged in and activated. Upon activating the continuous food cooker, the hot roller drive assembly 18 causes the first and second hollow hot rollers 52, 54 to rotate. As the first and second hot rollers 52, 54 are rotating, the heating elements 60 are receiving power and radiating heat. The hot rollers 52, 54 may operate at temperatures of approximately 900° F. in order to adequately cook the mixture 2. At this point, the mixture hopper 14 is placed on the top panel 24 of the housing 12. As the mixture hopper engages the housing 12, the timing gear 46 of the batter dispensing cam 42 engages one of the gears of the gear train 70 of the hot roller drive assembly 18. The mixture dispensing cam 42 will begin to rotate upon engaging the timing gear 46. As the longitudinal dispensing slot 44 of the mixture dispensing cam 42 rotates into a vertical orientation, the mixture will flow through the longitudinal dispensing slot 44. As the mixture 2 flows through the longitudinal dispensing slot 44, it drips down into the channel 53 of the hot roller assembly 16.

Figure 2A:
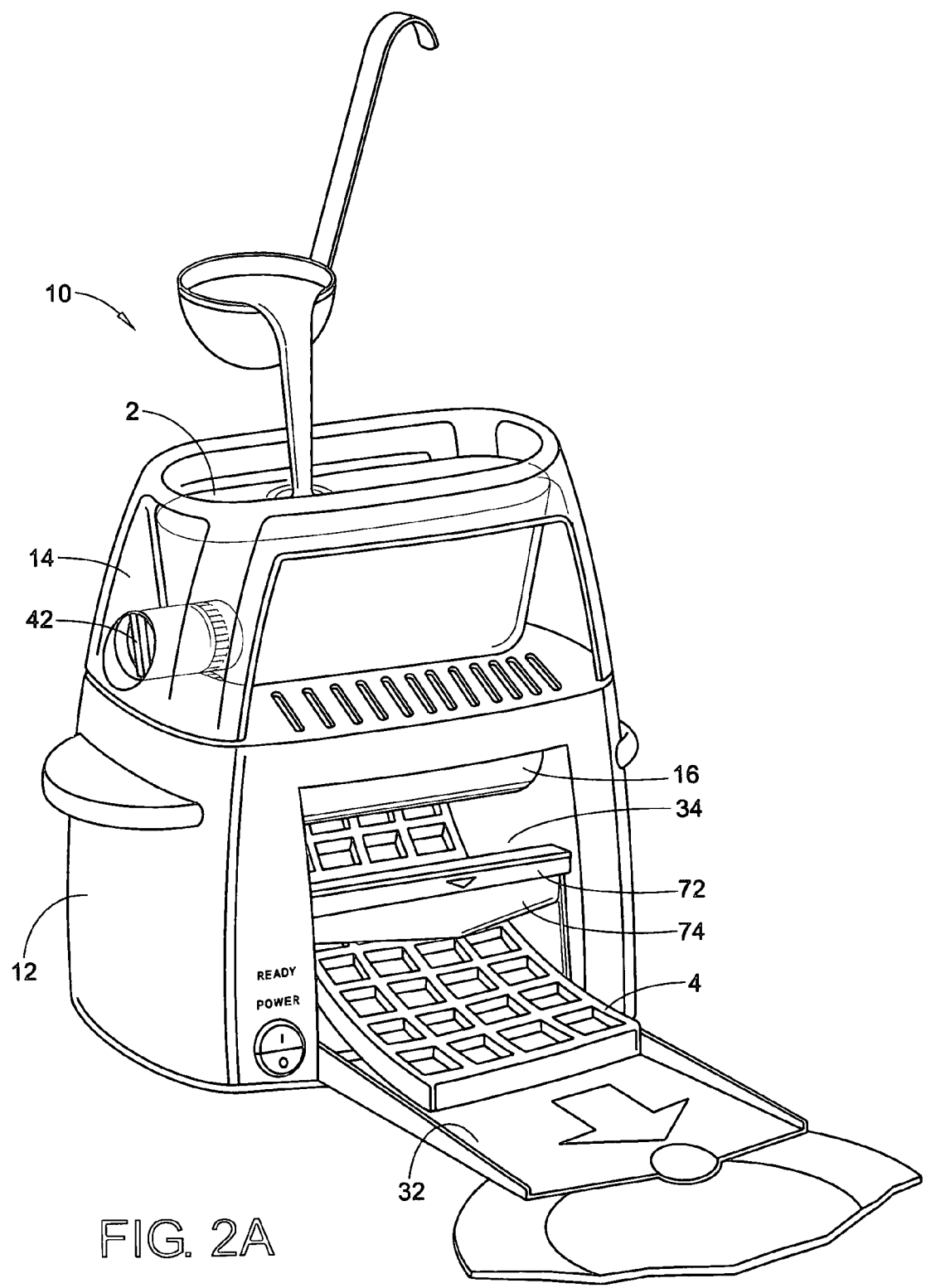
FIG. 2A is a perspective view of the first embodiment of the continuous food cooker illustrating the operation of the continuous food cooker.
Figure 2B:
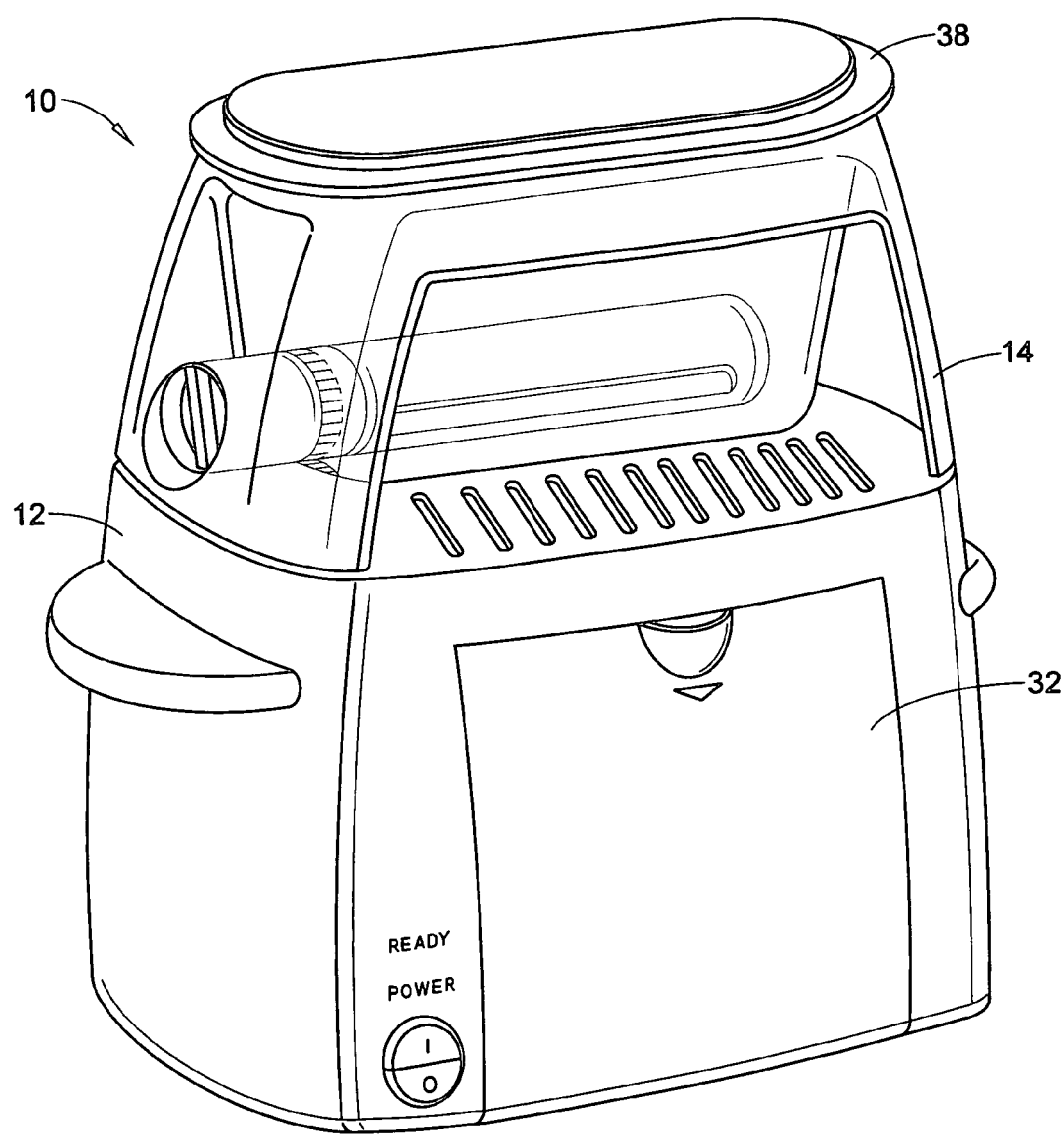
FIG. 2B is a perspective view of the first embodiment of the continuous food cooker illustrating the compact configuration of the continuous food cooker.
Figure 2:
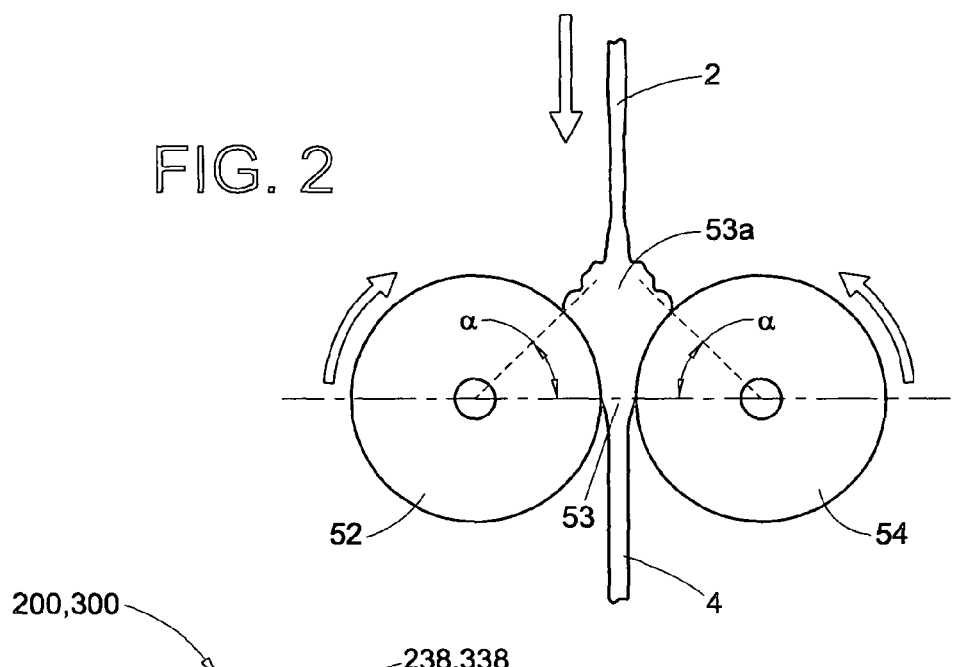
FIG. 2 is a vertical sectional view of the first embodiment of the continuous food cooker through the hot roller assembly illustrating the cooking zone in and around the channel between the hot rollers.

As shown in FIG. 2, a cooking zone 53a is formed around the channel 53. The cooking zone 53a begins along a horizontal plane defined by the axis of rotation of both of the hot rollers 52, 54 and extends upward along the outer surface of the hot roller 53, 54 to an angle α approximately 45 degrees from the horizontal plane. The mixture 2 is initially "flash cooked" as it comes into contact with the hot outer surface of the hot rollers 52, 54 and continues to cook by conductive heat transfer from the hot rollers into the central area of the channel 53. The hot rollers 52, 54 rotate at a rate appropriate to cook the mixture 2 without leaving it doughy or burnt.

With reference to FIG. 2A, a waffle 4 is made in a continuous fashion as it progresses through the hot roller cavity 34 and out the front of the continuous food cooker 10 gliding along the dispensing tray 32. The user may elect to create a waffle as long or short as they desire. Once the waffle has reached a length of their preference, the user can apply pressure to the cutter portion 72 of the cutter assembly 20, pushing in a downward direction to engage the cutter surface 74 with the waffle 4. The user may repeat the cutting process as the waffles continue to be produced by the continuous food cooker until the user has as many waffles as he or she desires. When the user has finished using the continuous food cooker machine, they may power it off and store any unused mixture by applying the removable lid to the hopper 14 and placing the hopper in a refrigerated area. In addition, the user of the continuous food cooker 10 may elect to remove the hot rollers 52, 54 (as in the process described below with reference to FIG. 3) in order to clean the hot rollers 52, 54 and the hot roller cavity 34 of the continuous food cooker 10.

Figure 5:
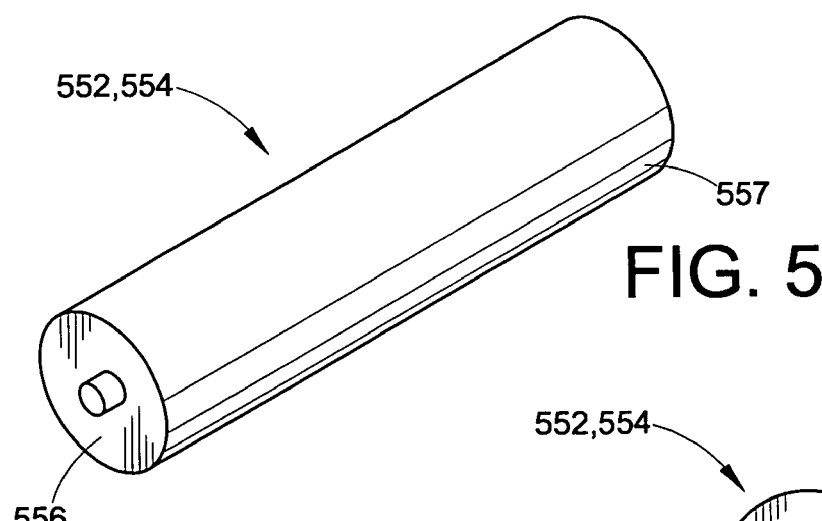
FIG. 5 is a perspective view of a roller design used in a fifth embodiment of the continuous food cooker.

Now with reference to FIG. 2B, the continuous food cooker 10 is shown in its compact configuration. The compact configuration allows the continuous food cooker 10 to be stored or transported with ease. As shown in FIG. 5, the dispensing tray 32 is in the upright closed position, the hopper 14 is engaged on the housing 12, and the removable lid 38 is attached. In this configuration, the continuous food cooker 10 consumes a limited amount space such that it may be stored in a typical overhead or under the counter kitchen cabinet. In addition to its compact design, the use of resilient plastic materials in fabrication allow the continuous food cooker 10 to be lightweight and transported with minimal effort or inconvenience.

Figure 3:
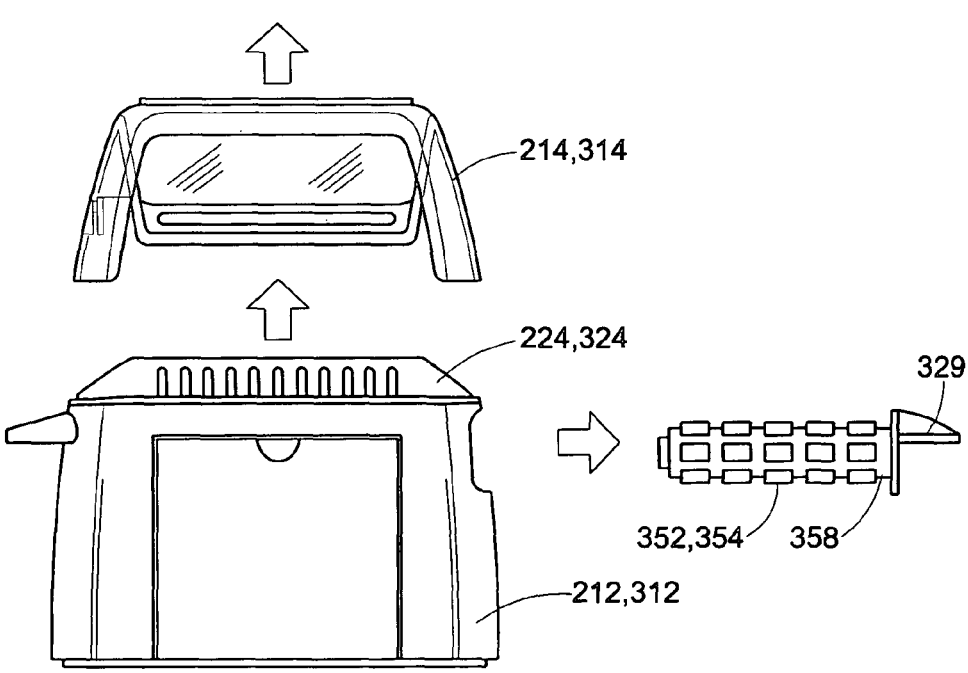
FIG. 3 is a frontal elevation view of a second embodiment and a third embodiment of the continuous food cooker illustrating the removable hot roller assembly and hopper.

Now with reference to FIG. 3, a second embodiment and a third embodiment of the continuous food cooker 200, 300 is shown. In particular, the mixture hopper 214, 314 and the hot rollers are removeable from the housing 212, 312 for the purposes of cleaning and maintenance. Also, the hopper 214, 314 may be removed from the top panel 224, 324 of the housing 212, 312 simply by lifting the hopper 214, 314 in an upward motion. When uncooked food mixture remains and the user wishes to store the unused food mixture, the user may apply the removable lid 228, 338 to the hopper 214, 314 before refrigerating the food mixture. In a third embodiment of the continuous food cooker 300, one of the carrying handles 329 may be integrated with the free end 358 of the hot rollers 352, 354 and the roller journals 362. As shown in FIG. 3, the user of the continuous food cooker 300 may grip handle 329 and in one outward pulling motion remove the hot rollers 352, 354 from the housing 312 as a one piece assembly.

Figure 4:
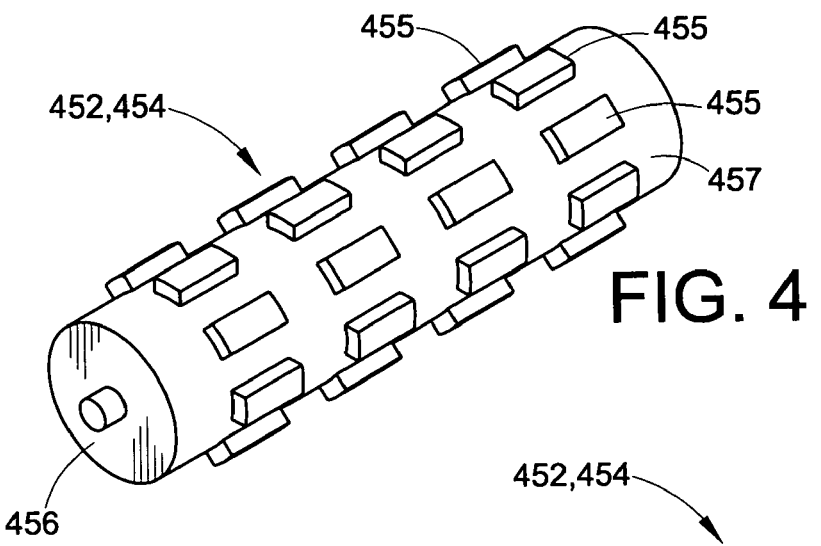
FIG. 4 is a perspective view of a roller design used in a fourth embodiment of the continuous food cooker.
Figure 4A:
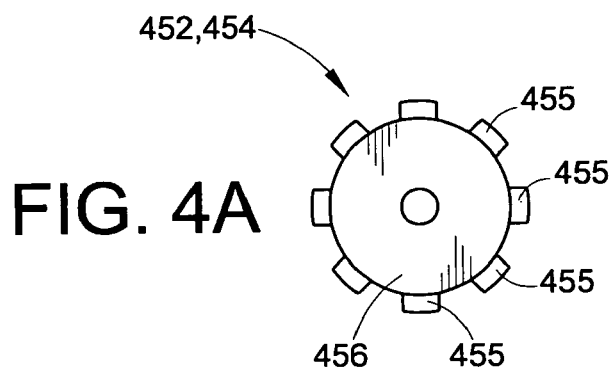
FIG. 4A is a side elevation view of the roller design shown in FIG. 4.

Now with reference to FIGS. 4 through 7, a series of different rollers may be used in the continuous food cooker invention for cooking, forming, grilling or toasting various types of food. In order to accommodate a variety of foods and food texture preferences, the rollers may be equipped with a multitude of different surface features. With reference to FIG. 4, a fourth embodiment of the continuous food cooker may have rollers 452, 454 having a plurality of rectangular protrusions 455 as surface features. The protrusions 455 of the fourth embodiment shown in FIG. 4 extend perpendicularly outward from a cylindrical outer skin 457. Naturally, any number of surface features may be arranged along the cylindrical outer skin to form a desired pattern. The rollers 452, 454 of the fourth embodiment are very similar to the rollers 52 and 54 of the first embodiment. By way of example, the rectangular protrusions 455 of the fourth embodiment would be particularly useful in forming and cooking waffles. In this case, as the mixture flows between the rollers 452, 454, and takes on certain impressions created by the rectangular protrusions 455. Thus, the resulting waffle would have the characteristic grid-like square depressions on either side of the waffle. With reference to FIG. 4A, a side elevation view of a driven end 456 of the rollers 452, 454 is shown. FIG. 4A clearly illustrates the arrangement of the rectangular protrusion 455 in eight rows formed along the longitudinal axis of the rollers 452, 454.

Figure 5A:
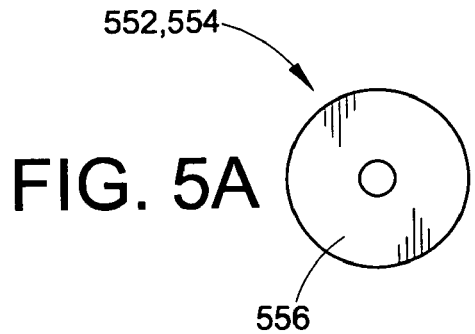
FIG. 5A is a side elevation view of the roller design shown in FIG. 5.

Now with reference to FIG. 5, a fifth embodiment of the rollers 552, 554 is shown. In this case, the rollers 552, 554 have no surface features along a cylindrical outer skin 557. In fact, as the food mixture enters the channel between the rollers 552, 554, the resulting cooked food product will have a very smooth surface on either side of the food product. By way of example, this embodiment of the rollers 552, 554 may be used in making pancakes or cooking bacon. In addition, one particular advantage of using the continuous food cooker to cook bacon using the rollers 552, 554 is that it results in healthier bacon with less fat, grease, and oil as compared to conventional methods of cooking bacon. Pressure exerted onto the bacon as it passes between the heated rollers 552, 554 not only facilitates the cooking of the bacon, but also serves to squeeze out excess oil, fat and other greases that are a result of the cooking process. In the case of cooking thin sliced meat products (such as bacon, chicken, or steak), the user may opt to remove the hopper and manually feed the strips of meat into and between the rollers 552,554. FIG. 5A shows a side elevation view of a driven end 556 of the rollers 552, 554 clearly illustrating that there are no surface features in this particular embodiment.

Figure 6:
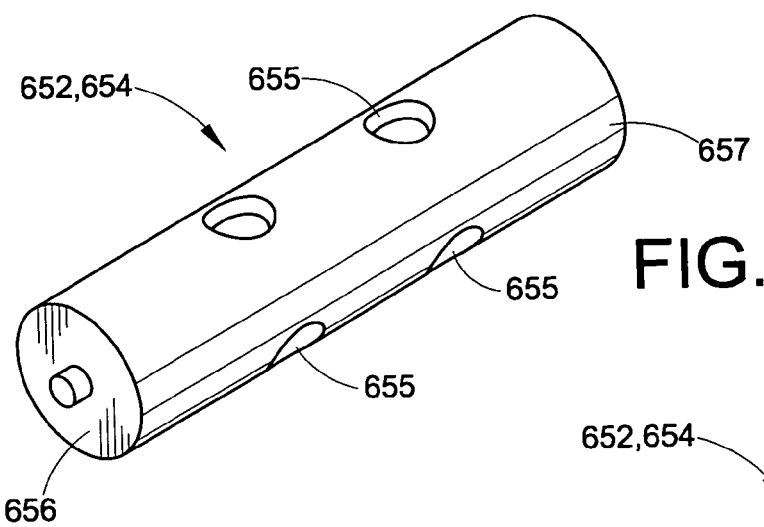
FIG. 6 is a perspective view of a roller design used in a sixth embodiment of the continuous food cooker.
Figure 6A:
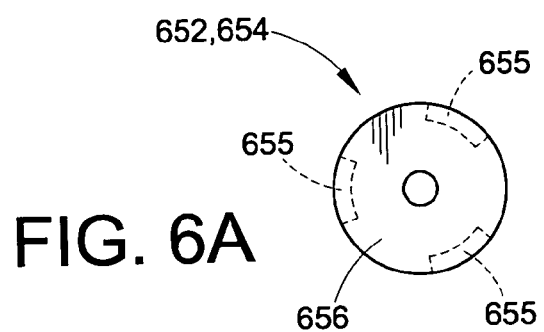
FIG. 6A is a side elevation view of the roller design shown in FIG. 6.

Now with reference to FIG. 6, a sixth embodiment of the continuous food cooker utilizing a pair of rollers 652, 654 is shown. In this embodiment, the rollers 652, 654 are particularly suited for cooking doughy-type products such as cookies. The surface features of the rollers 652, 654 consist of circular or oval-like depressions 655 in a cylindrical outer skin 657 of the roller 652, 654. As before, any number of depressions 655 may be arranged along the outer skin 657. To further illustrate the depressions 655 in the rollers 652, 654, FIG. 6A illustrates the side elevation view of a driven end of the rollers 652, 654. The dashed lines shown in FIG. 6A would represent the overall width and depth of the depressions 655 in a cross-sectional view of the rollers 652, 654. In this embodiment, the rollers 652, 654 may be located in close proximity to one another such that the cylindrical outer skin 657 of each roller would be nearly touching the other. In addition, the two rollers 652, 654 would be synchronized such that the depressions 655 come into alignment within the cooking zone as the two rollers rotate. By maintaining a very close tolerance between the two rollers 652, 654 any amount of trimming required about the perimeter of the cooked food product, such as a cookie, would be reduced to a minimum.

Figure 7:
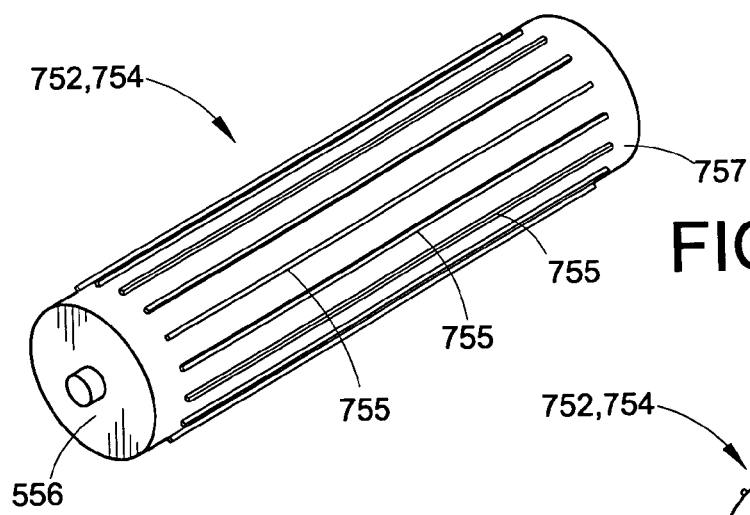
FIG. 7 is a perspective view of a roller design used in a seventh embodiment of the continuous food cooker.
Figure 7A:
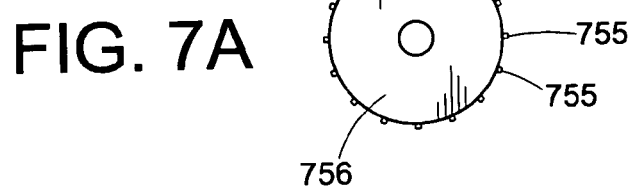
FIG. 7A is a side elevation view of the roller design shown in FIG. 7.

With reference to FIG. 7, a seventh embodiment of the rollers 752, 754 is shown. In the seventh embodiment, the rollers 752, 754 have a plurality of longitudinally oriented strips or grooves 755. The strips 755 may either protrude outward from a cylindrical outer skin 757 or they may be recessed. The rollers 752, 754 of the seventh embodiment would be particularly suited for gripping harder surface-type food products such as in toasting or grilling sandwiches, subs, or slices of bread. To further illustrate the surface features 755 of the rollers 752, 754, FIG. 7A shows a side elevation view of a driven end 756 of the rollers 752, 754. As shown in FIG. 7A, the surface features or strips 755 protrude outwardly from the cylindrical outer skin 757.

Lastly, it should be noted that yet other embodiments of the continuous food cooker may incorporate a hot roller adjustment assembly for adjusting the mixture channel to accommodate various types of food items. The adjustment assembly could be manually operated by rotating a threaded drive screw or could be automatic such that the mixture channel automatically increases or decreases in size to maintain a fixed amount of pressure exerted between the hot rollers and onto the food item being cooked. This automatic method of adjustment could be accomplished by hingedly suspending one of the hot rollers in parallel configuration to the other while having a biasing element, such as an extension spring, maintain tension between the rollers. Furthermore, additional embodiments of the continuous food cooker provide for a hot roller drive assembly that includes a hot roller speed adjustment assembly using a rheostat, pulse width modulator, or transmission having different gear ratios. Finally, any of the embodiments described above may also include a temperature adjustable hot roller heater element for adjusting the cooking temperature depending on the food item or user preference.

Several exemplary embodiments have thus been described. Modifications and alterations may occur to others upon reading and understanding the proceeding detailed description. It is intended that the exemplary embodiments be construed as including all such modifications and alterations insofar as they come within the scope of the appended claims or equivalence thereof.

The invention claimed is:

1. A continuous food cooker for producing a cooked food item in a continuous fashion, the continuous food cooker comprising:
    a frame, including a base;
    a hot roller assembly for forming and cooking a food mixture, the roller assembly including a first rotatable hot roller, a second rotatable hot roller, and at least one heating element for heating the first rotatable hot roller and the second rotatable hot roller, wherein the first rotatable hot roller, the second rotatable hot roller, and the at least one heating element are disposed internally to the frame;
    a hot roller drive assembly, including a motor operatively attached to and for rotating the first rotatable hot roller and the second rotatable hot roller;
    a hopper for receiving the food mixture and for dispensing the food mixture into the continuous food cooker, the hopper disposed above and secured to the frame; and
    a rotatable mixture dispensing cam disposed between the hopper and the hot roller assembly, the dispensing cam including a generally cylindrical outer surface and a food mixture aperture for dispensing the food mixture through the dispensing cam into the hot roller assembly.

2. The continuous food cooker of claim 1, further including a cutter slideably engaged in the frame for cutting the cooked food item at a desired length.

3. The continuous food cooker of claim 1, wherein the hopper is removably attached.

4. The continuous food cooker of claim wherein the hot roller assembly is removably attached.

5. The continuous food cooker of claim 1, wherein the hopper is formed from a translucent plastic material for monitoring a level of the food mixture in the reservoir.

6. The continuous food cooker of claim 1, wherein the food mixture aperture of the mixture dispensing cam is a longitudinal slot.

7. The continuous food cooker of claim 1, wherein the mixture dispensing cam is operatively attached and synchronized to one of the first rotatable hot roller and the second rotatable hot roller.

8. The continuous food cooker of claim 1, wherein the hopper includes a removable lid for sealing an unused portion of the food mixture within the hopper.

9. The continuous food cooker of claim 1, wherein the frame further includes a pair of side panels attached to the base of the frame, the pair of side panels including a handle on each of the side panels for ease of transportation.

10. The continuous food cooker of claim 1, wherein the frame includes a folding down dispensing tray, the dispensing tray including a lower edge, the lower edge being pivotally mounted to the base of the frame.

11. The continuous food cooker of claim 1, wherein an outer surface of at least one of the first rotatable hot roller and the second rotatable hot roller includes at least one surface feature and where the at least one surface feature is at least one of generally rectangular protrusions, generally circular depressions, strips, and grooves.

12. A portable continuous food cooker capable of receiving a food mixture and producing a cooked food item in a continuous fashion, the portable continuous food cooker comprising:
    a housing, including a base;
    a hopper, including a reservoir for receiving the food mixture;
    a hot roller assembly, including a first hot roller and a second hot roller for forming and cooking the food mixture, the first hot roller and the second hot roller including a heating element for heating the respective hot rollers, the hot rollers being in a close parallel configuration and disposed internally to the housing;
    a hot roller drive assembly including a motor operatively attached to the first hot roller and the second hot roller, wherein the hot roller drive assembly drives the first hot roller in an opposite direction from the second hot roller; and
    a food mixture cooking channel being defined between an outer surface of the first hot roller and an outer surface of the second hot roller, the food mixture channel receiving the food mixture where a first side portion of the food mixture and a second side portion of the food mixture are cooked by simultaneously contacting the outer surface of the first hot roller and the outer surface of the second hot roller.

13. The portable continuous food cooker of claim 12, further including a cutter secured to the housing for cutting the cooked food item at a desired length.

14. The portable continuous food cooker of claim 12, further including a mixture dispensing cam rotatably mounted in the reservoir for metering the flow of the food mixture.

15. The portable continuous food cooker of claim 12, further including a dispensing tray pivotally mounted to the housing.

16. The portable continuous food cooker of claim 12, further including an adjustable speed controller for adjusting and maintaining the speed of the motor of the hot roller drive assembly.

17. The portable continuous food cooker of claim 12, further including an adjustable temperature controller for adjusting and maintaining the temperature of the hot rollers.

18. The portable continuous food cooker of claim 12, further including a carrying handle removably secured to the housing and wherein the carrying handle, the first hot roller, and the second hot roller are integral and removable as a one piece assembly from the housing.

19. The portable continuous food cooker of claim 12, further including a rotatable dispensing cam, the dispensing cam disposed above the hot roller assembly and including an aperture for dispensing the food mixture into the food mixture cooking channel.

20. The portable continuous food cooker of claim 12, further including a hot roller adjustment assembly for adjusting the size of the mixture channel to accommodate various types of food items.

21. A portable household continuous food cooker capable of receiving a food mixture and producing a cooked food item in a continuous fashion, the portable household continuous food cooker comprising:
- a housing, including a base;
- a hopper, including a reservoir for receiving the food mixture;
- a hot roller assembly, including a first hollow hot roller and a second hollow hot roller for forming and cooking the food mixture, the hollow hot rollers being rotatably mounted in a close parallel configuration internally to the housing;
- a heating element disposed internally to each of the hollow hot rollers, each heating element disposed along an axis of rotation for the respective hollow hot roller; and
- a hot roller drive assembly including a motor, the motor operatively coupled to the first hollow hot roller and the second hollow hot roller, the first hollow hot roller rotating in an opposite direction from the second hollow hot roller.

22. The portable household continuous food cooker of claim 21, further including a mixture dispensing cam rotatably mounted in the reservoir for metering the flow of the food mixture.

23. The portable household continuous food cooker of claim 22, wherein the mixture dispensing cam is operatively attached and synchronized to one of the hollow hot rollers.

24. The portable household continuous food cooker of claim 21, further including a dispensing tray pivotally mounted to the housing.

25. The portable household continuous food cooker of claim 21, wherein the hopper is removably attached.

26. The portable household continuous food cooker of claim 21, wherein the hot roller assembly is removably attached.

27. The portable household continuous food cooker of claim 21, further including a carrying handle removably secured to the housing and wherein the carrying handle, the first hollow hot roller, and the second hollow hot roller are integral and removable as a one piece assembly from the housing.

28. The portable household continuous food cooker of claim 21, further including a cutter slideably engaged in the housing for cutting the cooked food item at a desired length.

29. A continuous food cooker capable of receiving a food mixture and producing a cooked food item in a continuous fashion, the continuous food cooker comprising:
- a housing, including a base;
- a hopper, including a reservoir for receiving the food mixture;
- a hot roller assembly, including a first hollow hot roller and a second hollow hot roller for forming and cooking the food mixture, the hollow hot rollers being rotatably mounted in a close parallel configuration internally to the housing;
- a heating element disposed internally to each of the hollow hot rollers, each heating element being stationary relative to the housing; and
- a hot roller drive assembly including a motor, the motor operatively coupled to the first hollow hot roller and the second hollow hot roller, the first hollow hot roller rotating in an opposite direction from the second hollow hot roller.

30. A continuous food cooker capable of receiving a food mixture and producing a cooked food item in a continuous fashion, the continuous food cooker comprising:
- a frame, including a base;
- a hopper including a reservoir for receiving the food mixture;
- a hot roller assembly supported by the frame, the hot roller assembly including a first hot roller and a second hot roller for forming and cooking the food mixture, the hot rollers being rotatable mounted in a close parallel configuration;
- a heating element disposed internally to each of the hollow hot rollers;
- a hot roller drive assembly including a motor operatively attached to the first hot roller and the second hot roller, wherein the hot roller drive assembly drives the first hot roller in an opposite direction from the second hot roller; and
- a food mixture cooking channel being defined between an outer surface of the first hot roller and an outer surface of the second hot roller, the food mixture channel receiving the food mixture where a first side portion of the food mixture and a second side portion of the food mixture are cooked by simultaneously contacting the outer surface of the first hot roller and the outer surface of the second hot roller.

31. The continuous food cooker of claim 30, wherein each respective heating element is disposed along an axis of rotation for each respective hot roller.

32. The continuous food cooker of claim 30, wherein each hot roller is hollow and each heating element is stationary relative to the frame.

33. The continuous food cooker of claim 30, further including a generally cylindrical mixture dispensing cam, the dispensing cam including a food mixture aperture for dispensing the food mixture through the dispensing cam into the hot roller assembly.

* * * * *